US012726275B2

(12) United States Patent
Zhang et al.

(10) Patent No.: US 12,726,275 B2
(45) Date of Patent: Sep. 1, 2026

(54) CIRCUIT APPARATUS FOR CALIBRATING UNEQUAL-ARM INTERFEROMETER, AND QUANTUM COMMUNICATION DEVICE

(71) Applicant: QUDOOR TECHNOLOGIES INC., Beijing (CN)

(72) Inventors: Jian Zhang, Beijing (CN); Renqing Fu, Beijing (CN); Guofeng Zhang, Beijing (CN)

(73) Assignee: QUDOOR TECHNOLOGIES INC., Beijing (CN)

( * ) Notice: Subject to any disclaimer, the term of this patent is extended or adjusted under 35 U.S.C. 154(b) by 198 days.

(21) Appl. No.: 18/853,362

(22) PCT Filed: Sep. 6, 2022

(86) PCT No.: PCT/CN2022/117185
§ 371 (c)(1),
(2) Date: Oct. 1, 2024

(87) PCT Pub. No.: WO2023/184864
PCT Pub. Date: Oct. 5, 2023

(65) Prior Publication Data

US 2026/0189307 A1 Jul. 2, 2026

(30) Foreign Application Priority Data

Apr. 1, 2022 (CN) ......................... 202210335458.7

(51) Int. Cl.
*H04B 10/04* (2006.01)
*H04B 10/07* (2013.01)
(Continued)

(52) U.S. Cl.
CPC ........... *H04B 10/564* (2013.01); *H04B 10/07* (2013.01); *H04B 10/501* (2013.01);
(Continued)

(58) Field of Classification Search
CPC ...... H04B 10/70; H04B 10/564; H04B 10/07; H04B 10/501; H04B 10/516; H04B 10/60;
(Continued)

(56) References Cited

U.S. PATENT DOCUMENTS 7,492,900 B2 * 2/2009 Yuan ..................... H04L 9/0858 380/263
8,306,225 B2 * 11/2012 Shields .................. H04B 10/70 713/168
(Continued)

FOREIGN PATENT DOCUMENTS

CN 2225637 Y 4/1996
CN 103828031 A 5/2014
(Continued)

OTHER PUBLICATIONS

ISR for PCT Application No. PCT/CN2022/117185 mailed Dec. 16, 2022.

*Primary Examiner* — Hanh Phan
(74) *Attorney, Agent, or Firm* — The Sun IP Law

(57) ABSTRACT

A circuit apparatus for calibrating an unequal-arm interferometer, and a quantum communication device are provided. The circuit apparatus includes: a constant-voltage power supply; a heater, provided on a short arm of the unequal-arm interferometer; and a diode, reversely connected between a positive electrode and a negative electrode of output ends of the constant-voltage power supply, and connected in series with the heater, wherein the diode provides a corresponding reverse saturation current to the heater according to a change in ambient temperature, so as to counteract an excess amount of an optical path change on a long arm of the unequal-arm interferometer under the effect of the change in the ambient temperature, relative to an optical path change
(Continued)

on the short arm of the unequal-arm interferometer under the effect of the change in the ambient temperature.

20 Claims, 3 Drawing Sheets

(51) Int. Cl.
*H04B 10/50* (2013.01)
*H04B 10/516* (2013.01)
*H04B 10/564* (2013.01)
*H04B 10/60* (2013.01)
*H04B 10/70* (2013.01)

(52) U.S. Cl.
CPC .......... *H04B 10/516* (2013.01); *H04B 10/60* (2013.01); *H04B 10/70* (2013.01)

(58) Field of Classification Search
CPC . H04B 10/548; H04B 10/5561; H04L 9/0858; H04L 9/0852; H04L 9/0869
USPC ....... 398/197, 140, 141, 183, 188, 135, 136, 398/33, 38, 198, 158, 159, 137, 138, 139; 380/255, 256, 278, 277, 263, 44
See application file for complete search history.

(56) References Cited

U.S. PATENT DOCUMENTS

| | | | |
|---|---|---|---|
| 10,578,494 | B1 | 3/2020 | Tiemann |
| 2004/0190725 | A1 | 9/2004 | Yuan |

FOREIGN PATENT DOCUMENTS

| | | | |
|---|---|---|---|
| CN | 109257109 | A | 1/2019 |
| CN | 110389406 | A | 10/2019 |
| CN | 113132096 | A | 7/2021 |
| CN | 114157367 | A | 3/2022 |
| CN | 114499654 | A | 5/2022 |

* cited by examiner

CIRCUIT APPARATUS FOR CALIBRATING UNEQUAL-ARM INTERFEROMETER, AND QUANTUM COMMUNICATION DEVICE

CROSS REFERENCE

The present disclosure is a national stage filing under 35 U.S.C. § 371 of international application number PCT/CN2022/117185, filed Sep. 6, 2022, which claims the benefit of priority of Chinese patent application No. CN202210335458.7, filed on Apr. 1, 2022, the entire contents of which are incorporated herein by reference.

TECHNICAL FIELD

The present disclosure relates to the technical field of quantum communications, and in particular, to a circuit apparatus for calibrating an unequal-arm interferometer, and a quantum communication device.

BACKGROUND

Currently, in a quantum communication system (such as a quantum key distribution system), three encoding modes, i.e. polarization encoding, phase encoding and time phase encoding, are mainly adopted. Among the three encoding modes, both the phase encoding and the time phase encoding need to achieve encoding and decoding by using an unequal-arm interferometer. However, the interference effect of the unequal-arm interferometer tends to be deteriorated due to the effect of the surrounding environment, which may lead to an increase in the error rate of the quantum communication system, thereby significantly reducing the coding rate of the quantum communication system.

Therefore, improving the adaptability of the unequal-arm interferometer to the surrounding environment to ensure the stability of the interference effect of the unequal-arm interferometer becomes a problem to be solved urgently.

SUMMARY

Embodiments of the present disclosure provide a circuit apparatus for calibrating an unequal-arm interferometer, and a quantum communication device.

According to an aspect of the embodiments of the present disclosure, provided is a circuit apparatus for calibrating an unequal-arm interferometer. The circuit apparatus includes: a constant-voltage power supply; a heater, provided on a short arm of the unequal-arm interferometer; and a diode, reversely connected between a positive electrode and a negative electrode of output ends of the constant-voltage power supply, and connected in series with the heater, wherein the diode provides a corresponding reverse saturation current to the heater according to a change in ambient temperature, so as to counteract an excess amount of an optical path change on a long arm of the unequal-arm interferometer under the effect of the change in the ambient temperature, relative to an optical path change on the short arm of the unequal-arm interferometer under the effect of the change in the ambient temperature.

According to another aspect of the embodiments of the present disclosure, provided is a quantum communication device, the quantum communication device including the apparatus for calibrating the unequal-arm interferometer as stated above.

The circuit apparatus for calibrating the unequal-arm interferometer, and the quantum communication device provided in the embodiments of the present disclosure improve the adaptability of the unequal-arm interferometer to the surrounding environment to ensure the stability of the interference effect of the unequal-arm interferometer, which improves the efficiency, stability and reliability of the coding rate of a quantum communication system employing the unequal-arm interferometer.

BRIEF DESCRIPTION OF THE DRAWINGS

The described objects and features of the embodiments of the present disclosure will become more apparent from the following description taken in conjunction with the accompanying drawings.

DETAILED DESCRIPTION OF THE EMBODIMENTS

Hereinafter, the embodiments of the present disclosure will be described in detail with reference to the accompanying drawings.

Figure 1:
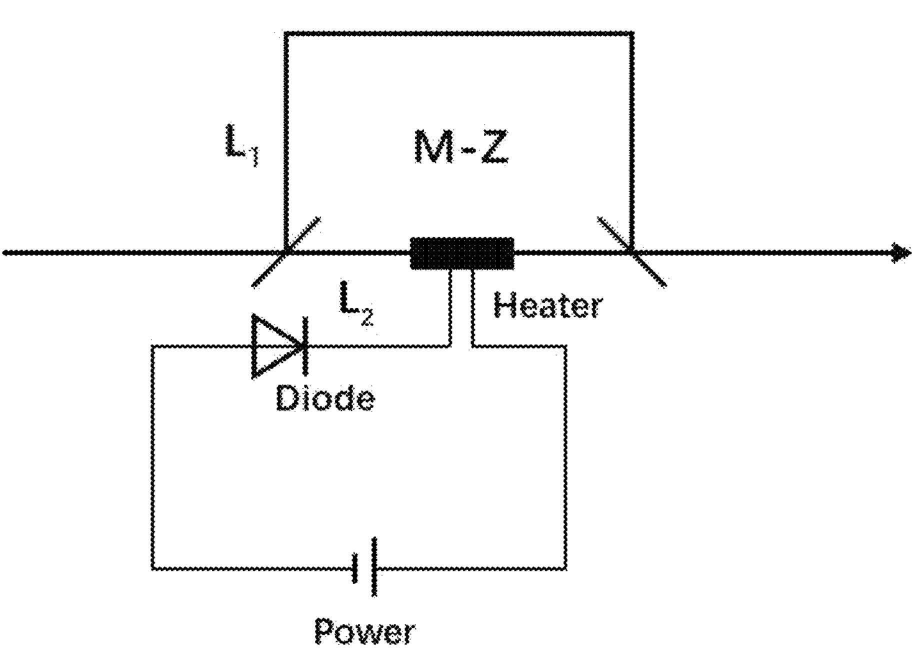
FIG. 1 is a schematic diagram of a circuit apparatus for calibrating an unequal-arm interferometer according to exemplary embodiments of the present disclosure.

FIG. 1 is a schematic diagram of a circuit apparatus for calibrating an unequal-arm interferometer according to exemplary embodiments of the present disclosure.

Referring to FIG. 1, the circuit apparatus for calibrating the unequal-arm interferometer according to exemplary embodiments of the present disclosure may at least include a constant-voltage power supply (denoted as Power hereinafter), a heater (denoted as Heater hereinafter) and a diode (denoted as Diode hereinafter), wherein the Heater may be provided on a short arm $L_2$ of the unequal-arm interferometer (denoted as M-Z hereinafter); and the Diode may be reversely connected between a positive electrode and a negative electrode of output ends of the Power, and connected in series with the Heater. By way of example rather than limitation, the Diode may be, but is not limited to be, one of a germanium diode and a silicon diode. By way of example rather than limitation, the Power may be, but is not limited to be, a direct-current regulated power supply having an output voltage of 12 volts.

In the circuit apparatus for calibrating the unequal-arm interferometer as shown in FIG. 1, the Diode may provide a corresponding reverse saturation current to the Heater according to a change in ambient temperature, so as to counteract an excess amount of an optical path change on a long arm $L_1$ of the M-Z under the effect of the change in the ambient temperature, relative to an optical path change on the short arm $L_2$ of the M-Z under the effect of the change in the ambient temperature.

In an example, when the ambient temperature increases, a reverse characteristic portion of the volt-ampere characteristic curve of the Diode may move downward, such that the reverse saturation current provided by the Diode increases, and the increase of the reverse saturation current makes the optical path on the short arm $L_2$ of the M-Z longer based on the effect of the increase of the ambient temperature, so as to counteract an excess amount of the optical path change on the long arm $L_1$ of the M-Z under the effect of the increase in the ambient temperature, relative to the optical path change on the short arm $L_2$ of the M-Z under the effect of the increase in the ambient temperature.

In another example, when the ambient temperature decreases, a reverse characteristic portion of the volt-ampere characteristic curve of the Diode may move upward, such that the reverse saturation current provided by the Diode decreases, and the decrease of the reverse saturation current makes the optical path on the short arm $L_2$ of the M-Z shorter based on the effect of the decrease of the ambient temperature, so as to counteract an excess amount of the optical path change on the long arm $L_1$ of the M-Z under the effect of the decrease in the ambient temperature, relative to the optical path change on the short arm $L_2$ of the M-Z under the effect of the decrease in the ambient temperature.

By using the circuit apparatus, even if the ambient temperature of the unequal-arm interferometer changes in a small range, it can also be ensured that the optical path difference between the long arm and the short arm of the unequal-arm interferometer remains generally consistent along with the change in the ambient temperature (in other words, the change amount of the optical path difference between the long arm and the short arm of the unequal-arm interferometer can be decreased to the minimum). In this way, not only can a stable and reliable working environment be provided for the unequal-arm interferometer applied in a quantum communication system, but precision control of the optical path difference between the long arm and the short arm of the unequal-arm interferometer in the quantum communication system can also be improved, thereby ensuring the stability and reliability of the interference effect of the unequal-arm interferometer.

Figure 2:
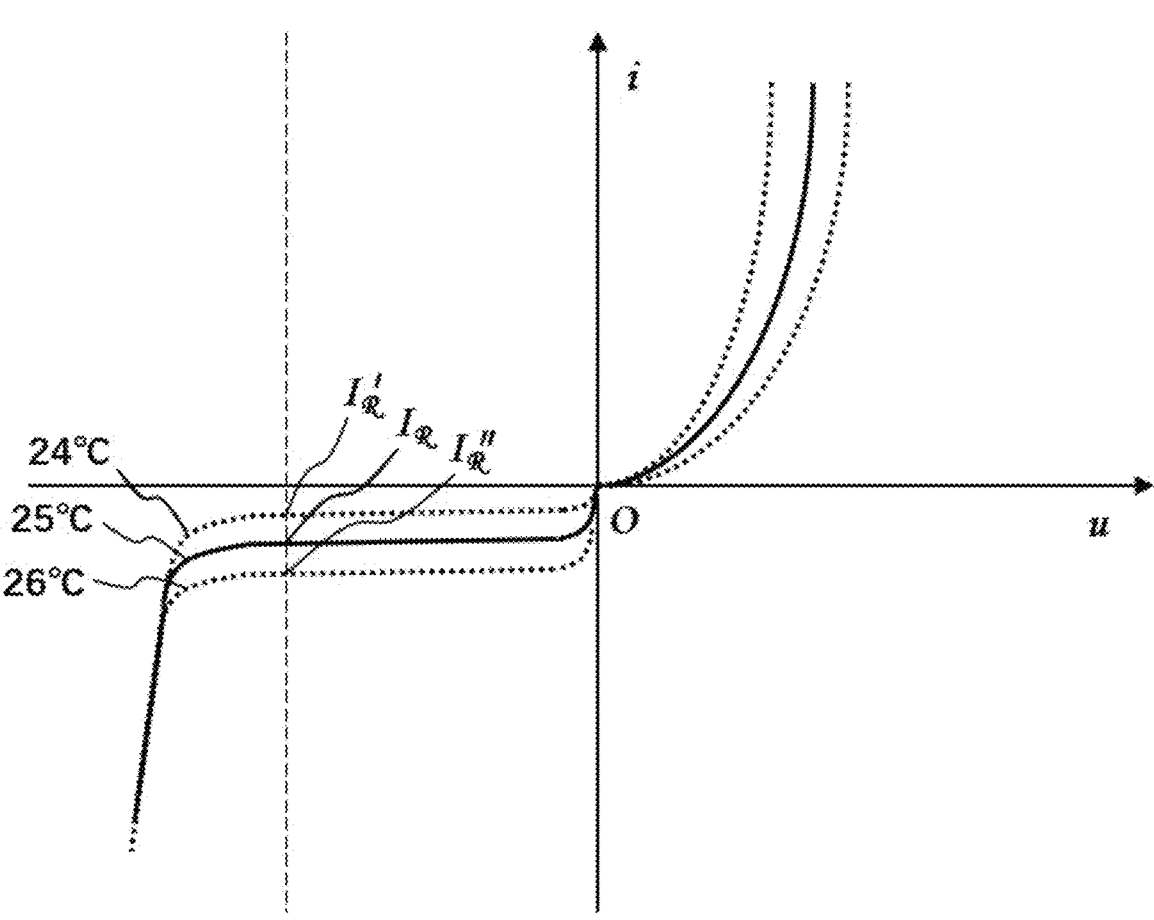
FIG. 2 is a schematic graph of the change of a volt-ampere characteristic curve of a diode along with ambient temperature according to exemplary embodiments of the present disclosure.

FIG. 2 is a schematic graph of the change of a volt-ampere characteristic curve of a diode along with ambient temperature according to exemplary embodiments of the present disclosure.

Referring to FIG. 2, the abscissa represents a voltage u across two ends of the Diode, and the ordinate represents a current i flowing through the Diode. The curves shown in FIG. 2 are respectively a volt-ampere characteristic curve of the Diode at 24° C., a volt-ampere characteristic curve of the Diode at 25° C. and a volt-ampere characteristic curve of the Diode at 26° C. Each of the volt-ampere characteristic curves includes a forward characteristic portion and a reverse characteristic portion.

It can be seen from FIG. 2 that in cases where the current ambient temperature is 25° C., when the ambient temperature increases from 25° C. to 26° C., the reverse characteristic portion of the volt-ampere characteristic curve of the Diode may move downward; and when the ambient temperature decreases from 25° C. to 24° C., the reverse characteristic portion of the volt-ampere characteristic curve of the Diode may move upward. The reverse characteristic that changes along with the change of the ambient temperature of the Diode can cause the change of heat released by the Heater provided on the short arm $L_2$ of the M-Z. This means that in addition to being affected by the ambient temperature, the optical path on the short arm $L_2$ of the M-Z is also affected by the heat released by the Heater provided on the short arm $L_2$ of the M-Z. Thus, the optical path on the short arm $L_2$ of the M-Z can change under the superimposed effect of the ambient temperature and the Heater.

Hereinafter, an exemplary implementation process of the example above will be further described in detail in conjunction with the change of the volt-ampere characteristic curve of the diode along with the ambient temperature as shown in FIG. 2.

In general, when the ambient temperature increases, both the optical path on the long arm $L_1$ of the M-Z and the optical path on the short arm $L_2$ of the M-Z increase; as the long arm $L_1$ of the M-Z is longer than the short arm $L_2$ of the M-Z, an optical path change $\Delta S_1$ on the long arm $L_1$ of the M-Z under the effect of the increase in the ambient temperature will be longer than an optical path change $\Delta S_2$ on the short arm $L_2$ of the M-Z under the effect of the increase in the ambient temperature, which may cause an increase in an optical path difference between the long arm $L_1$ and the short arm $L_2$ of the M-Z, thereby decreasing performances, such as but not limited to, the coding rate of the quantum communication system.

However, for the M-Z using the described circuit apparatus, in the same case, for example, when the ambient temperature increases from 25° C. to 26° C., the reverse saturation current flowing through the Diode provided on the short arm $L_2$ of the M-Z may increase from $I_R$ to $I_R''$; and the increase of the reverse saturation current can increase the heat released by the Heater, which can then make the optical path on the short arm $L_2$ of the M-Z become longer based on the effect of the increase in the ambient temperature, thereby counteracting the excess amount $\Delta S_1-\Delta S_2$ of the optical path change $\Delta S_1$ on the long arm $L_1$ of the M-Z under the effect of the increase in the ambient temperature, relative to the optical path change $\Delta S_2$ on the short arm $L_2$ of the M-Z under the effect of the increase in the ambient temperature. In this way, it can be ensured that the optical path difference between the long arm $L_1$ and the short arm $L_2$ of the M-Z remains generally consistent along with the increase in the ambient temperature.

By the same reasoning, when the ambient temperature decreases, both the optical path on the long arm $L_1$ of the M-Z and the optical path on the short arm $L_2$ of the M-Z decrease; as the long arm $L_1$ of the M-Z is longer than the short arm $L_2$ of the M-Z, an optical path change $\Delta S_1$ on the long arm $L_1$ of the M-Z under the effect of the decrease in the ambient temperature will be longer than an optical path change $\Delta S_2$ on the short arm $L_2$ of the M-Z under the effect of the decrease in the ambient temperature, which may cause the optical path difference between the long arm $L_1$ and the short arm $L_2$ of the M-Z to become larger, thereby decreasing performances, such as but not limited to, the coding rate of the quantum communication system.

However, for the M-Z using the described circuit apparatus, in the same case, for example, when the ambient temperature decreases from 25° C. to 24° C., the reverse saturation current flowing through the Diode provided on the short arm $L_2$ of the M-Z may decrease from $I_R$ to $I_R'$; and the decrease of the reverse saturation current can decrease the heat released by the Heater, which can then make the optical path on the short arm $L_2$ of the M-Z become longer based on the effect of the decrease in the ambient temperature, thereby counteracting the excess amount $\Delta S_1-\Delta S_2$ of the optical path change $\Delta S_1$ on the long arm $L_1$ of the M-Z under the effect of the decrease in the ambient temperature, relative to the optical path change $\Delta S_2$ on the short arm $L_2$ of the M-Z under the effect of the decrease in the ambient temperature. In this way, it can be ensured that the optical path difference between the long arm $L_1$ and the short arm $L_2$ of the M-Z remains generally consistent along with the decrease in the ambient temperature.

In addition, by way of example rather than limitation, in the circuit apparatus for calibrating the unequal-arm interferometer as shown in FIG. 1, the Heater may include a heat conducting tube and a heating film (not shown), wherein the heat conducting tube may be sleeved outside of the short arm $L_2$ of the M-Z, and the heating film (internally including a resistive wire) may be wrapped outside of the heat conducting tube, wherein the diode may be connected in series with the heater through the heating film. However, some embodiments of the present disclosure are not limited thereto, and other resistive heating structures may also be used to implement the Heater, as needed. Here, the heat conducting tube in the Heater may be made of a material having an excellent heat conduction property such as, but not limited to, copper, etc.

Figure 3:
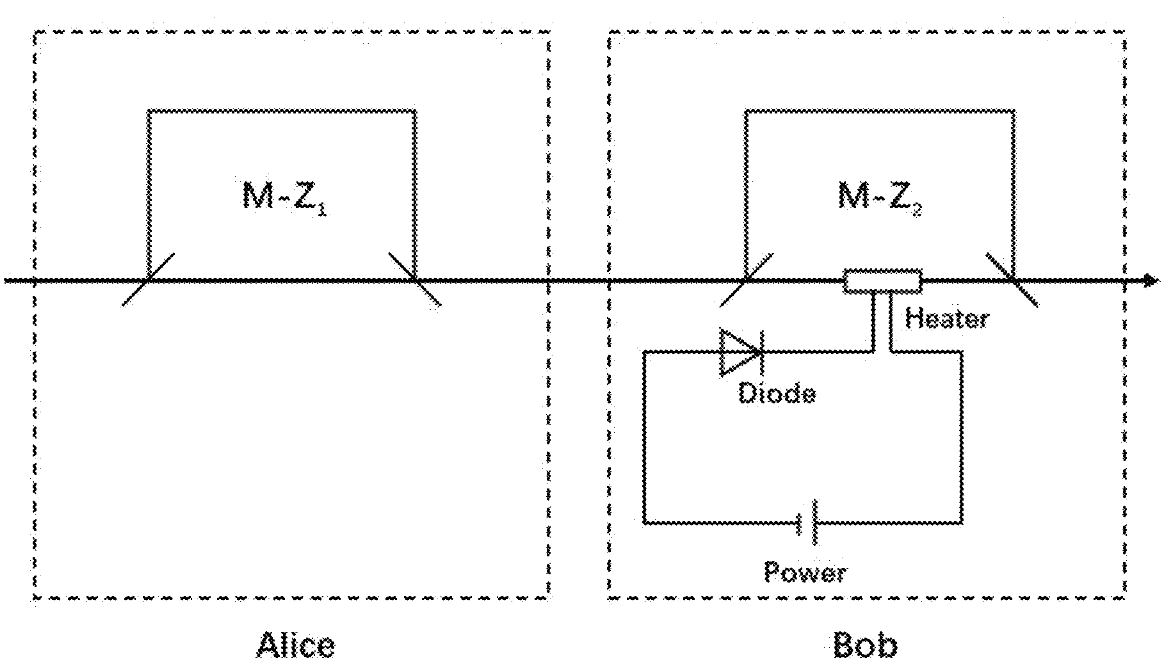
FIG. 3 is a schematic diagram of a quantum communication system including the circuit apparatus for calibrating the unequal-arm interferometer according to exemplary embodiments of the present disclosure.

FIG. 3 is a schematic diagram of a quantum communication system including the circuit apparatus for calibrating the unequal-arm interferometer according to exemplary embodiments of the present disclosure.

Referring to FIG. 3, the quantum communication system shown in FIG. 3 may be a phase encoding-based quantum key distribution system, and may alternatively be a time phase encoding-based quantum key distribution system. In this regard, the embodiments of the present disclosure are not limited to be applied to the specific systems.

It should be appreciated that although FIG. 3 shows that the circuit apparatus for calibrating the unequal-arm interferometer according to the exemplary embodiments of the present disclosure can be applied to the short arm of the unequal-arm interferometer M-$Z_2$ in a receiving end Bob of the quantum communication system, the circuit apparatus may alternatively or additionally be applied to the short arm of the unequal-arm interferometer M-$Z_1$ in a transmitting end Alice of the quantum communication system. This may improve the efficiency, stability and reliability of the coding rate of the quantum communication system (e.g. a quantum key distribution system based on phase encoding or time phase encoding) employing the unequal-arm interferometer.

While the present disclosure has been shown and described with reference to exemplary embodiments, it will be understood by those having ordinary skill in the art that various modifications and changes may be made to these embodiments without departing from the principle and scope of the present disclosure as defined by the appended claims.

What is claimed is:

1. A circuit apparatus for calibrating an unequal-arm interferometer, the circuit apparatus comprising:
   - a constant-voltage power supply;
   - a heater, provided on a short arm of the unequal-arm interferometer; and
   - a diode, reversely connected between a positive electrode and a negative electrode of output ends of the constant-voltage power supply, and connected in series with the heater, so as to provide, to the heater, a reverse saturation current which changes along with a change in ambient temperature,
   - wherein by means of a change amount of the reverse saturation current provided by the diode, the circuit apparatus counteracts an excess amount of an optical path change on a long arm of the unequal-arm interferometer under the effect of the change in the ambient temperature, relative to an optical path change on the short arm of the unequal-arm interferometer under the effect of the change in the ambient temperature.

2. The circuit apparatus according to claim 1, wherein when the ambient temperature increases, the reverse saturation current provided by the diode increases, and the increase of the reverse saturation current makes an optical path on the short arm of the unequal-arm interferometer longer based on the effect of the increase of the ambient temperature, so as to counteract the excess amount of the optical path change on the long arm of the unequal-arm interferometer under the effect of the increase in the ambient temperature, relative to the optical path change on the short arm of the unequal-arm interferometer under the effect of the increase in the ambient temperature.

3. The circuit apparatus according to claim 1, wherein when the ambient temperature decreases, the reverse saturation current provided by the diode decreases, and the decrease of the reverse saturation current makes an optical path on the short arm of the unequal-arm interferometer shorter based on the effect of the decrease of the ambient temperature, so as to counteract the excess amount of the optical path change on the long arm of the unequal-arm interferometer under the effect of the decrease in the ambient temperature, relative to the optical path change on the short arm of the unequal-arm interferometer under the effect of the decrease in the ambient temperature.

4. The circuit apparatus according to claim 1, wherein the heater comprises:
   - a heat conducting tube, sleeved outside of the short arm of the unequal-arm interferometer; and
   - a heating film, wrapped outside of the heat conducting tube,
   - wherein the diode is connected in series with the heater through the heating film.

5. The circuit apparatus according to claim 4, wherein the heat conducting tube is made of copper.

6. The circuit apparatus according to claim 4, wherein the heating film internally comprises a resistive wire.

7. The circuit apparatus according to claim 1, wherein the diode is one of a germanium diode and a silicon diode.

8. The circuit apparatus according to claim 1, wherein the unequal-arm interferometer is comprised in a transmitting end and/or a receiving end of a quantum communication system.

9. The circuit apparatus according to claim 8, wherein the quantum communication system is based on phase encoding or time phase encoding.

10. The circuit apparatus according to claim 8, wherein an output voltage of the constant-voltage power supply is 12 volts.

11. A quantum communication device, the quantum communication device comprising: a circuit apparatus for calibrating an unequal-arm interferometer, wherein the circuit apparatus comprises:
   - a constant-voltage power supply;
   - a heater, provided on a short arm of the unequal-arm interferometer; and
   - a diode, reversely connected between a positive electrode and a negative electrode of output ends of the constant-voltage power supply, and connected in series with the heater, so as to provide, to the heater, a reverse saturation current which changes along with a change in ambient temperature,
   - wherein by means of a change amount of the reverse saturation current provided by the diode, the circuit apparatus counteracts an excess amount of an optical path change on a long arm of the unequal-arm interferometer under the effect of the change in the ambient temperature, relative to an optical path change on the short arm of the unequal-arm interferometer under the effect of the change in the ambient temperature.

12. The quantum communication device according to claim 11, wherein when the ambient temperature increases, the reverse saturation current provided by the diode increases, and the increase of the reverse saturation current makes an optical path on the short arm of the unequal-arm interferometer longer based on the effect of the increase of the ambient temperature, so as to counteract the excess amount of the optical path change on the long arm of the unequal-arm interferometer under the effect of the increase in the ambient temperature, relative to the optical path change on the short arm of the unequal-arm interferometer under the effect of the increase in the ambient temperature.

13. The quantum communication device according to claim 11, wherein when the ambient temperature decreases, the reverse saturation current provided by the diode decreases, and the decrease of the reverse saturation current makes an optical path on the short arm of the unequal-arm interferometer shorter based on the effect of the decrease of the ambient temperature, so as to counteract the excess amount of the optical path change on the long arm of the unequal-arm interferometer under the effect of the decrease in the ambient temperature, relative to the optical path change on the short arm of the unequal-arm interferometer under the effect of the decrease in the ambient temperature.

14. The quantum communication device according to claim 11, wherein the heater comprises:

a heat conducting tube, sleeved outside of the short arm of the unequal-arm interferometer; and a heating film, wrapped outside of the heat conducting tube, wherein the diode is connected in series with the heater through the heating film.

15. The quantum communication device according to claim 14, wherein the heat conducting tube is made of copper.

16. The quantum communication device according to claim 14, wherein the heating film internally comprises a resistive wire.

17. The quantum communication device according to claim 11, wherein the diode is one of a germanium diode and a silicon diode.

18. The quantum communication device according to claim 11, wherein the unequal-arm interferometer is comprised in a transmitting end and/or a receiving end of a quantum communication system.

19. The quantum communication device according to claim 18, wherein the quantum communication system is based on phase encoding or time phase encoding.

20. The quantum communication device according to claim 18, wherein an output voltage of the constant-voltage power supply is 12 volts.

* * * * *